US012789831B2

(12) United States Patent
Lee

(10) Patent No.: US 12,789,831 B2
(45) Date of Patent: Nov. 10, 2026

(54) VEHICLE AND A CONTROL METHOD THEREOF

(71) Applicants: HYUNDAI MOTOR COMPANY, Seoul (KR); KIA CORPORATION, Seoul (KR)

(72) Inventor: Dong Ju Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 3 days.

(21) Appl. No.: 18/952,429

(22) Filed: Nov. 19, 2024

(65) Prior Publication Data

US 2025/0296589 A1 Sep. 25, 2025

(30) Foreign Application Priority Data

Mar. 21, 2024 (KR) ........................ 10-2024-0039236

(51) Int. Cl.
*B60W 50/14* (2020.01)

(52) U.S. Cl.
CPC ..... *B60W 50/14* (2013.01); *B60W 2554/4044* (2020.02); *B60W 2554/80* (2020.02); *B60W 2556/40* (2020.02)

(58) Field of Classification Search
CPC ............. B60W 50/14; B60W 2556/40; B60W 2554/4044; B60W 2554/80
See application file for complete search history.

(56) References Cited

U.S. PATENT DOCUMENTS

| | | | | |
|---|---|---|---|---|
| 7,904,223 | B2 * | 3/2011 | Le | B60R 21/0132 180/282 |
| 9,508,261 | B2 * | 11/2016 | Rentschler | B60W 30/16 |
| 9,758,092 | B2 * | 9/2017 | Pal | G08G 1/163 |
| 10,518,698 | B2 * | 12/2019 | Pal | B60Q 1/48 |
| 11,094,196 | B2 * | 8/2021 | Kim | G08G 1/04 |
| 11,634,142 | B2 * | 4/2023 | Pohl | B60W 30/0956 701/301 |
| 11,760,355 | B2 * | 9/2023 | Lewandowski | B60W 10/04 701/26 |
| 12,033,508 | B2 * | 7/2024 | Kim | G08G 1/14 |
| 12,509,062 | B2 * | 12/2025 | Sugiarto | B60W 30/06 |
| 12,646,412 | B2 * | 6/2026 | Kim | G08G 1/14 |
| 2009/0099734 | A1 * | 4/2009 | Le | B60R 21/0132 701/46 |

(Continued)

*Primary Examiner* — Hoi C Lau
(74) *Attorney, Agent, or Firm* — Lempia Summerfield Katz LLC

(57) ABSTRACT

A method of controlling a vehicle comprises: obtaining, by a processor executing computer instructions stored in a memory, a location of a host vehicle and information related to surroundings of the host vehicle based on sensor information and map information; determining, by the processor, an entrance of the host vehicle into a parking area based on the location of the host vehicle and the information related to the surroundings; determining, by the processor, a layout of the parking area based on the sensor information and the map information; determining, by the processor, a location of an obstacle around the host vehicle based on the layout of the parking area, and controlling, by the processor, the host vehicle based on a movement of a target vehicle that intersects a target line formed in a longitudinal direction of the host vehicle.

19 Claims, 7 Drawing Sheets

(56) References Cited

U.S. PATENT DOCUMENTS

| | | | | |
|---|---|---|---|---|
| 2013/0226407 | A1* | 8/2013 | Rentschler | B60W 30/09 701/41 |
| 2015/0179075 | A1* | 6/2015 | Lee | G08G 1/165 340/932.2 |
| 2015/0321555 | A1* | 11/2015 | Fukata | B60W 50/12 701/70 |
| 2017/0166115 | A1* | 6/2017 | Pal | B60Q 5/005 |
| 2019/0359218 | A1* | 11/2019 | Pohl | B60W 30/0956 |
| 2020/0005641 | A1* | 1/2020 | Park | G08G 1/144 |
| 2020/0193830 | A1* | 6/2020 | Kim | G08G 1/168 |
| 2020/0211071 | A1* | 7/2020 | Rosas-Maxemin | G06N 20/00 |
| 2020/0349617 | A1* | 11/2020 | Rosas-Maxemin | G06N 20/00 |
| 2021/0302978 | A1* | 9/2021 | Noguchi | B62D 15/0285 |
| 2021/0303002 | A1* | 9/2021 | Shimamoto | G05D 1/0297 |
| 2022/0076440 | A1* | 3/2022 | Lim | G06V 20/56 |
| 2022/0114893 | A1* | 4/2022 | Kim | G08G 1/14 |
| 2022/0234572 | A1* | 7/2022 | Tsuruoka | G08G 1/096725 |
| 2022/0284813 | A1* | 9/2022 | Sugano | B60W 30/06 |
| 2022/0292971 | A1* | 9/2022 | Park | G06V 20/586 |
| 2022/0396271 | A1* | 12/2022 | Lewandowski | B60W 10/20 |
| 2023/0053728 | A1* | 2/2023 | Jin | G01C 21/3685 |
| 2023/0296387 | A1* | 9/2023 | Nimura | G08G 1/143 701/400 |
| 2023/0375347 | A1* | 11/2023 | Nimura | B60W 40/06 |
| 2023/0394967 | A1* | 12/2023 | Lee | B60W 60/0025 |
| 2024/0068820 | A1* | 2/2024 | Nimura | G01C 21/20 |
| 2024/0317214 | A1* | 9/2024 | Sugiarto | G06T 7/70 |
| 2024/0416954 | A1* | 12/2024 | Ogawa | G08G 1/143 |
| 2025/0002006 | A1* | 1/2025 | Ogawa | G08G 1/143 |
| 2025/0033661 | A1* | 1/2025 | Wang | B62D 15/0285 |
| 2025/0050866 | A1* | 2/2025 | Wang | B60W 30/06 |
| 2025/0214567 | A1* | 7/2025 | Park | B60W 30/06 |
| 2025/0296589 | A1* | 9/2025 | Lee | B60W 30/06 |
| 2025/0347530 | A1* | 11/2025 | Kim | G01C 21/383 |
| 2025/0368189 | A1* | 12/2025 | Park | B60W 30/06 |

* cited by examiner

VEHICLE AND A CONTROL METHOD THEREOF

CROSS-REFERENCE TO RELATED APPLICATIONS

This application claims priority to Korean Patent Application No. 10-2024-0039236, filed on Mar. 21, 2024, the entire contents of which are incorporated herein by reference.

TECHNICAL FIELD

The present disclosure relates to a vehicle and a method of controlling the same, and, more particularly, to a vehicle capable of reducing unnecessary warning signals by optimizing warning conditions of a rear cross-traffic collision-avoidance assist (RCCA) and a method of controlling the same.

BACKGROUND

The statements in this section merely provide background information related to the present disclosure and may not constitute prior art.

An autonomous vehicle, which can reduce driver fatigue by performing driving, braking, and steering of the vehicle for the vehicle's driver, is required to have the ability to cope with surrounding situations that change in real time while it is driving.

An autonomous vehicle has at least one autonomous driving function.

For example, in order to achieve an autonomous driving function for sensing vehicles on the rear side to avoid collisions, a radar sensor on the rear side is required to have high accuracy in sensing targets.

Autonomous vehicles to which conventional technology has been applied often cause inconvenience to their drivers by generating unnecessary warnings signals regarding approaching vehicles that are not at risk of collision in places where many vehicles pass, such as parking lots.

For example, even when another vehicle approaches a host vehicle from a distance and turns to avoid the risk of collision, the host vehicle generates an unnecessary warning signal while the approaching vehicle is turning, often causing inconvenience to its driver.

SUMMARY

The present disclosure provides an autonomous vehicle and a method of controlling the same that enable users to use the rear cross-traffic safety function more effectively by avoiding or preventing unnecessary warning signals.

The technological problems to be solved through the present disclosure are not limited to those mentioned above, and the following description would enable a person having ordinary skill in the art to clearly understand other technological problems not mentioned above.

To resolve the technological problems, an embodiment of the present disclosure may provide a method of controlling a vehicle. In particular, the method comprises: obtaining, by a processor executing computer instructions stored in a memory, information related to a location of a host vehicle and information related to surroundings of the host vehicle based on sensor information provided by a sensor module and map information provided by a map storing unit; and determining, by the processor executing the computer instructions, an entrance of the host vehicle into a parking area based on the location of the host vehicle and the information related to the surroundings. The method further includes: determining, by the processor, a layout of the parking area based on the sensor information and the map information; determining, by the processor, a location of an obstacle around the host vehicle based on the layout of the parking area; and controlling, by the processor, the host vehicle based on a movement of a target vehicle that intersects a target line formed in a longitudinal direction of the host vehicle.

In at least one embodiment, the method further comprises determining an obstacle on a same side as the target vehicle with respect to the host vehicle as a target obstacle.

In at least one embodiment, controlling the host vehicle based on the movement of the target vehicle comprises determining the target line based on a center of the target obstacle and a rear center of the host vehicle.

In at least one exemplary embodiment, controlling the host vehicle based on the movement of the target vehicle further comprises determining the target vehicle based on an intersection between the target line and a heading direction of the target vehicle.

In at least one embodiment, controlling the host vehicle based on the movement of the target vehicle further comprises excluding the target vehicle from an object to be warned about, based on a movement of the target vehicle turning into a direction of the host vehicle on a distant passage with reference to a preset distance.

In at least one embodiment, controlling the host vehicle based on the movement of the target vehicle further comprises re-including the target vehicle as the object to warn of based on a movement of the target vehicle passing the target obstacle.

In at least one embodiment, controlling the host vehicle based on the movement of the target vehicle further comprises monitoring the target vehicle for a rear cross-traffic collision-avoidance assist (RCCA).

In an embodiment of the present disclosure, a vehicle may include: a sensor module, a map storing unit configured to store map information, and a processor configured to control a host vehicle by executing computer instructions stored in a memory. In particular, the processor is further configured to obtain information related to a location of a host vehicle and information related to surroundings of the host vehicle based on sensor information provided by a sensor module and map information provided by a map storing unit. The processor is also configured to: determine an entrance of the host vehicle into a parking area based on the location of the host vehicle and the information related to the surroundings, determine a layout of the parking area based on the sensor information and the map information, determine a location of an obstacle around the host vehicle based on the layout of the parking area, and control the host vehicle based on a movement of a target vehicle that intersects a target line formed in a longitudinal direction of the host vehicle.

In at least one embodiment, the processor may be further configured to determine an obstacle on the same side as the target vehicle with respect to the host vehicle as a target obstacle.

In at least one embodiment, the processor may be further configured to determine the target line based on a center of the target obstacle and a rear center of the host vehicle.

In at least one embodiment, the processor may be further configured to determine the target vehicle based on an intersection between the target line and a heading direction of the target vehicle.

In at least one embodiment, the processor may be further configured to exclude the target vehicle from an object to be warned about, based on a movement of the target vehicle turning into a direction of the host vehicle on a distant passage with reference to a preset distance.

In at least one embodiment, the processor may be further configured to re-include the target vehicle as the object to be warned about, based on a movement of the target vehicle passing the target obstacle.

In at least one embodiment, the processor may be further configured to monitor the target vehicle for a rear cross-traffic collision-avoidance assist (RCCA).

The autonomous vehicle and its control method, according to the present disclosure, can avoid or prevent the occurrence of unnecessary warning signals by selecting target vehicles that are not at risk of collision, and thus enable a driver to use the functions of the RCCA more effectively.

In addition, the autonomous vehicle and its control method, according to the present disclosure, may prevent the occurrence of unnecessary warning signals by selecting target vehicles that are not at risk of collision, thereby improving the reliability of warning signals raised by the RCCA.

In the case of the autonomous vehicle and its control method according to the present disclosure, unnecessary warning signals may be prevented by selecting target vehicles that are not at risk of collision, thereby improving the reliability of the RCCA warning signals. As a result, it may be possible for a driver to pay more attention to the RCCA warning signals while driving, enhancing driving safety.

In the case of the autonomous vehicle and the method of controlling the same according to the present disclosure, it may be possible to reduce the occurrence of unnecessary warning signals by further optimizing the warning conditions of the RCCA in consideration of the environment of parking lots installed inside or outside buildings.

The effects of the present disclosure are not limited to those mentioned above, and the following description would enable a person having ordinary skill in the art to clearly understand other effects not mentioned above.

The methods and apparatuses of the present disclosure have other features and advantages which should be apparent from or are set forth in more detail in the accompanying drawings, which are incorporated herein, and the following Detailed Description, which together serve to explain certain principles of the present disclosure.

Figure 1:
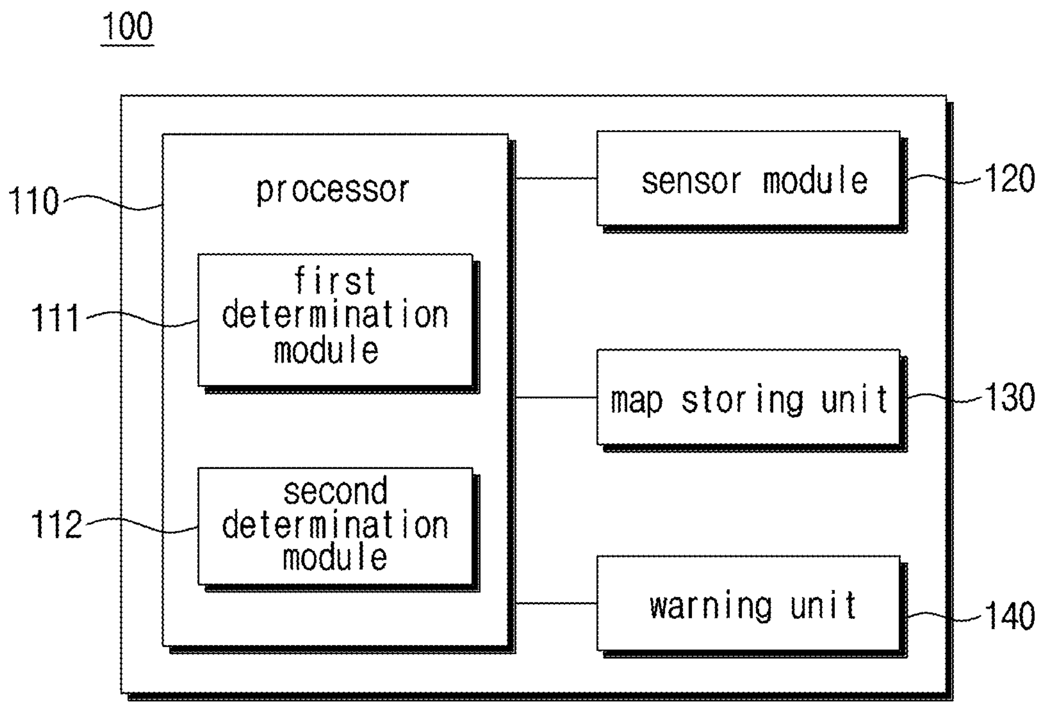
FIG. 1 is a block diagram for illustrating an autonomous vehicle according to an embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes, should be determined in part by the particularly intended application and use environment.

In the figures, the same reference numerals refer to the same or equivalent parts of the present disclosure throughout the several figures of the drawing.

DETAILED DESCRIPTION

Hereinafter, with reference to the attached drawings, the embodiments of the present disclosure are described in detail to allow a person having ordinary skill in the art to easily carry out them. However, the present disclosure can be carried out in various forms, and is not limited to the embodiments described herein. In addition, in order to clearly describe the present disclosure, parts not related to the description have been omitted from the drawings, and similar drawing reference numerals have been given to similar parts throughout the present disclosure.

Throughout the present disclosure, when a certain part is described to "include" a certain component, it does not mean that the part excludes the other components, but means that the part may further include the other components, unless specifically stated to the contrary. Furthermore, throughout the present disclosure, parts given the same reference numbers refer to the same components.

In addition, the terms "unit" and "control unit" in names such as a vehicle control unit (VCU) are only terms widely used to name a controller for controlling a certain function of a vehicle, and do not mean a generic function unit. For example, each controller may include a communication device that communicates with other controllers or sensors to control a function that the controller is responsible for, a memory that stores an operating system, logic instructions, input/output information, etc., and one or more processors that perform operations of determination, calculation, making decisions, etc. required to control the function. When a component, device, element, or the like of the present disclosure is described as having a purpose or performing an operation, function, or the like, the component, device, or element should be considered herein as being "configured to" meet that purpose or to perform that operation or function.

In the present disclosure, each of phrases such as "A or B", "at least one of A and B", "at least one of A or B", "A, B or C", "at least one of A, B and C", "at least one of A, B or C" and "at least one of A, B, or C, or a combination thereof" may include any one or all possible combinations of the items listed together in the corresponding one of the phrases.

The term "unit" or "module" used in this specification signifies one unit that processes at least one function or operation, and may be realized by hardware, software, or a combination thereof. The operations of the method or the functions described in connection with the forms disclosed herein may be embodied directly in a hardware or a software module executed by a processor, or in a combination thereof.

FIG. 1 is a view for illustrating an autonomous vehicle according to an embodiment of the present disclosure.

Referring to FIG. 1, an autonomous vehicle 100, according to an embodiment of the present disclosure, may include a processor 110, a sensor module 120, a map storing unit 130, and a warning unit 140.

The processor 110 may collect sensor information provided by the sensor module 120 and map information provided by the map storing unit 130 to obtain information on the location of a host vehicle 100 and information on surroundings of the host vehicle 100. The host vehicle 100 can be referred to as the autonomous vehicle 100. Hereinafter, the autonomous vehicle 100 is referred to as the host vehicle 100.

The processor 110 may analyze the information on the location of the host vehicle 100 and the information on the surroundings thereof, which have been obtained, to determine whether the host vehicle 100 has entered a parking lot, and the processor 110 may also generate a layout of the parking lot using the sensor information and the map information when determining that the host vehicle 100 has entered the parking lot.

The processor 110 may derive the location of obstacles around the host vehicle 100 from the generated layout of the parking lot. In addition, when there is another vehicle 200 approaching the warning area of the host vehicle 100, the processor 110 may set the other vehicle 200 as a target vehicle 200, and may give a warning alarm or prevent the warning alarm from being raised in response to the movements of the set target vehicle 200. A detailed description thereof is given below.

The sensor module 120 may be a sensor mounted on at least one of the front, the rear, or the sides of the host vehicle 100, etc. The sensor module 120 may scan the surroundings of the host vehicle 100, which is stopped/parked or running, in real time and provide the sensor information to the processor 110.

For example, the sensor module 120 may include a radar, a camera, a LIDAR, etc.

For example, at least one radar may be mounted on the host vehicle 100. The radar may measure a relative speed and a relative distance with a sensed object together with a wheel speed sensor (not shown) mounted on the host vehicle 100. For example, the radar may be mounted on the rear and the rear sides of the host vehicle 100 to sense objects in the rear. Here, the objects in the rear may be people, objects, the other vehicle 200, the target vehicle 200, etc.

At least one camera may be mounted on the host vehicle 100. For example, the camera may include a wide-angle camera. The camera may capture objects, their states, etc. around the host vehicle 100 and output image data based on the captured. For example, the camera may be mounted on the side or the rear of the host vehicle 100 and sense objects on the rear sides of the host vehicle 100.

At least one LIDAR may be mounted on the host vehicle 100. The LIDAR may radiate a laser pulse to an object that can be measured and then measure the time it takes for the laser pulse to bounce back from the object to obtain information on the distance to the object, the direction of the object, the speed of the object, etc., The LIDAR may output LIDAR data based on the obtained information. Here, the object may be an obstacle, a vehicle, a person, an object, etc. outside the host vehicle 100.

As described above, the sensor module 120 may include at least one camera, ultrasonic wave, radar, LIDAR, etc. mounted on the host vehicle 100 to sense the other vehicle 200, which is moving or stationary, or pillars, parking lines, etc. in a parking lot, under the control of the processor 110. It is not limited thereto.

The map storing unit 130 may store map information including GPS information provided by a GPS system under the control of the processor 110.

For example, it may be possible to check the current location of the host vehicle 100 in real time using the GPS information of the host vehicle 100 included in the map information. The map information may include a general map for determining whether the vehicle is currently in a parking lot, a detailed map containing information on a detailed layout of the interior of a building, etc. It is not limited thereto.

Under the control of the processor 110, the warning unit may give a visual/auditory/tactile warning alarm to a driver when a warning signal is provided. For example, the warning unit may generate a warning alarm in various ways using devices such as a cluster, speaker, haptic, or display unit of the host vehicle 100 so that the driver can notice a dangerous situation.

The processor 110 may include a first determination module 111, a second determination module 112, and a third determination module.

The first determination module 111 may analyze the sensor information provided by the sensor module 120 and the map information provided by the map storing unit 130, and may determine whether the vehicle is currently in a parking lot based on the analysis results and where the host vehicle 100 is parked in the parking lot based on information on the surroundings of the host vehicle 100.

The first determination module 111 can be referred to as a location determination module or a surroundings/vehicle location determination module.

The second determination module 112 may determine whether the other vehicle 200 is approaching the warning area of the host vehicle 100 based on the location of the host vehicle 100 that is determined by the first determination module 111. The second determination module 112 may set or identify the other vehicle 200 approaching the warning area as the target vehicle 200. In addition, the second determination module 112 may determine whether there is a risk of collision between the target vehicle 200 and the host vehicle 100, and may determine whether to generate a warning signal or a canceling signal to cancel the warning signal and then output it.

Figure 2:
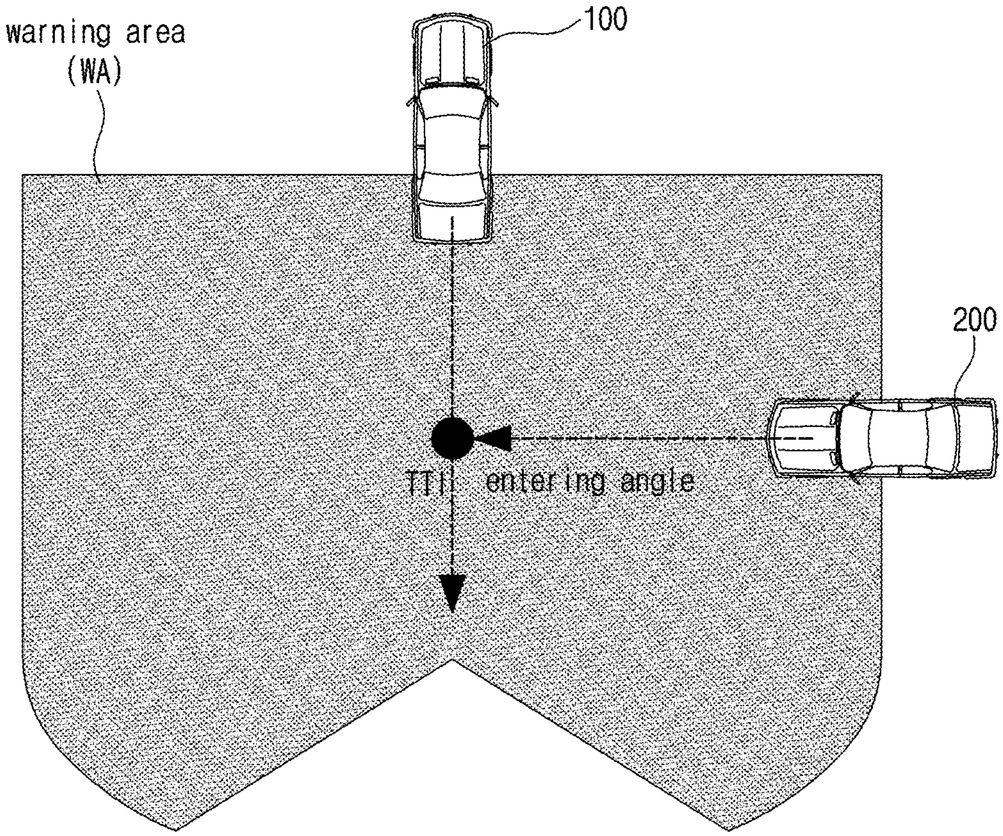
FIG. 2 is a view for illustrating warning conditions of a rear cross-traffic collision-avoidance assist (RCCA) according to an embodiment of the present disclosure.

FIG. 2 is a view for illustrating warning conditions of a rear cross-traffic collision-avoidance assist (RCCA) according to an embodiment of the present disclosure.

As shown in FIG. 2, the second determination module 112 may generate a warning signal when the warning conditions of the RCCA are satisfied.

For example, the warning conditions may include first to third warning conditions.

The first warning condition may be whether the other vehicle 200 has entered the warning area, which is a certain area or a predetermined area, and the second warning condition may be an angle at which the target vehicle 200 enters the warning area toward the host vehicle 100. The third warning condition may include the time (TTI) for the target vehicle 200 driving at the current angle at which it enters to reach an intersection on the movement path of the host vehicle 100, and whether the intersection is within the warning area, etc. Here, the processor 110 may set the other vehicle 200 as the target vehicle 200 when it enters the warning area.

The second determination module 112 may generate a warning signal when all of the first to third warning conditions are satisfied.

The above-described second determination module 112 may be referred to as a warning determination module or a risk/warning determination module.

Figure 3:
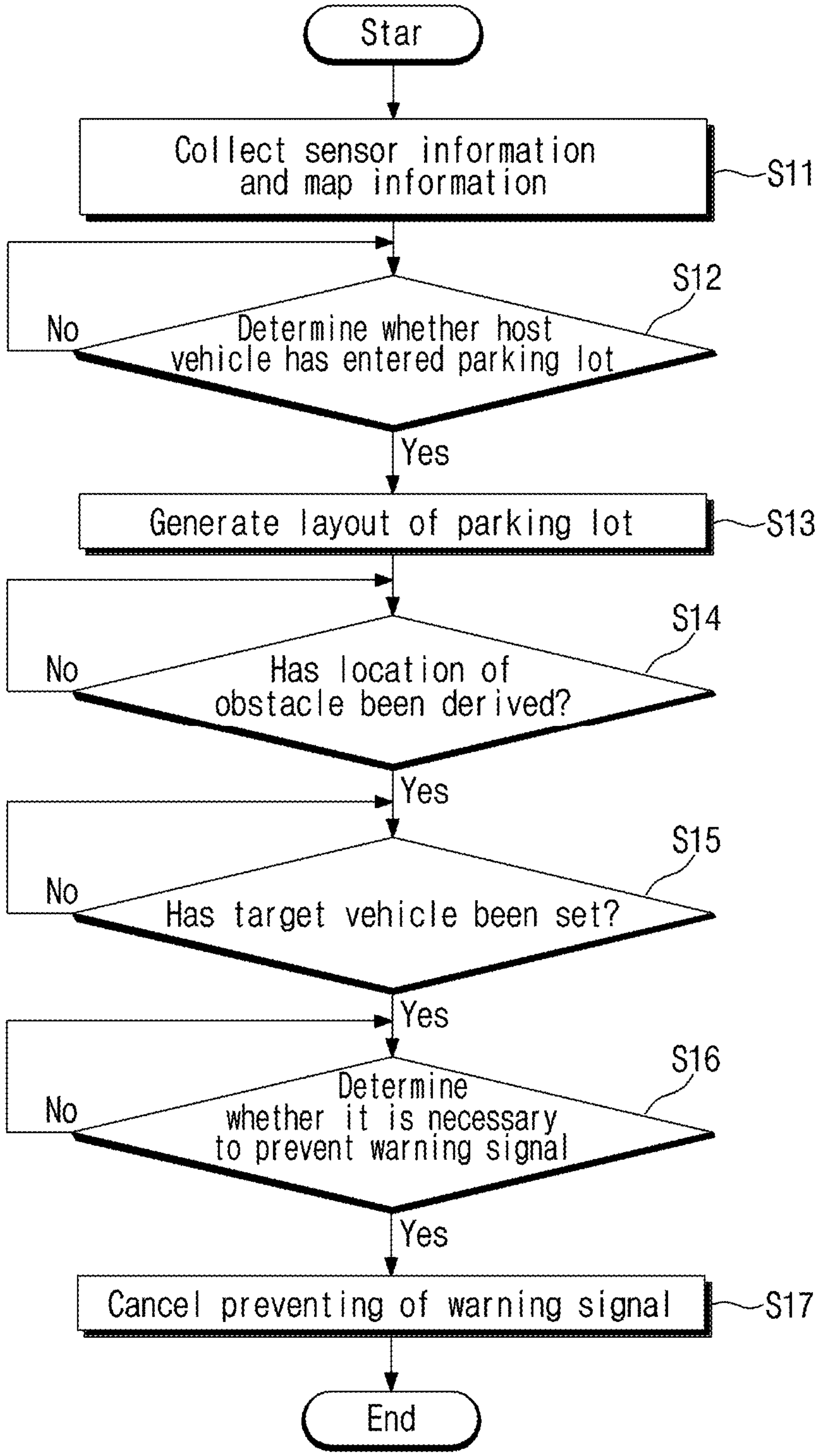
FIG. 3 is a flowchart illustrating a method of controlling the autonomous vehicle according to an embodiment of the present disclosure.
Figure 4:
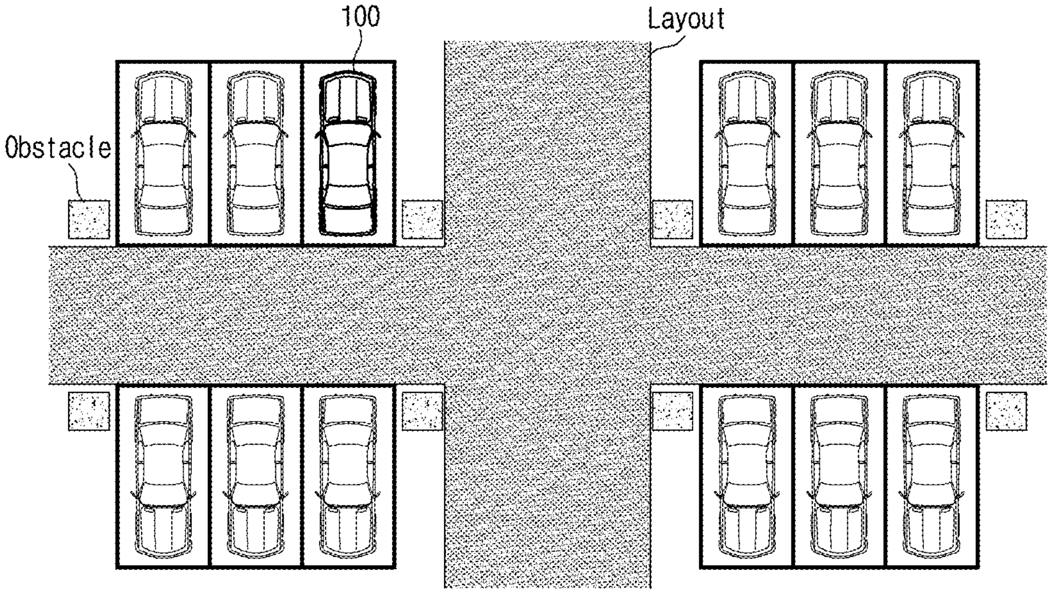
FIGS. 4 to 6 are views for illustrating the structure of a parking lot visualized based on at least one sensor information and map information according to an embodiment of the present disclosure.
Figure 5:
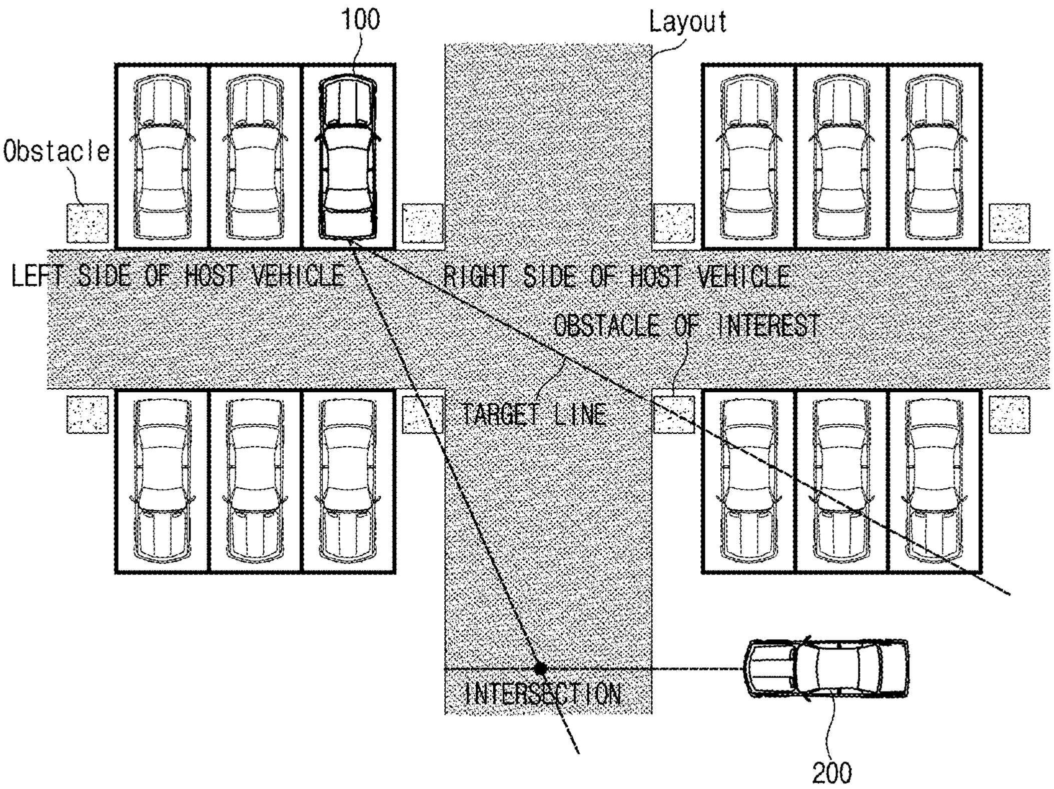
Figure 6:
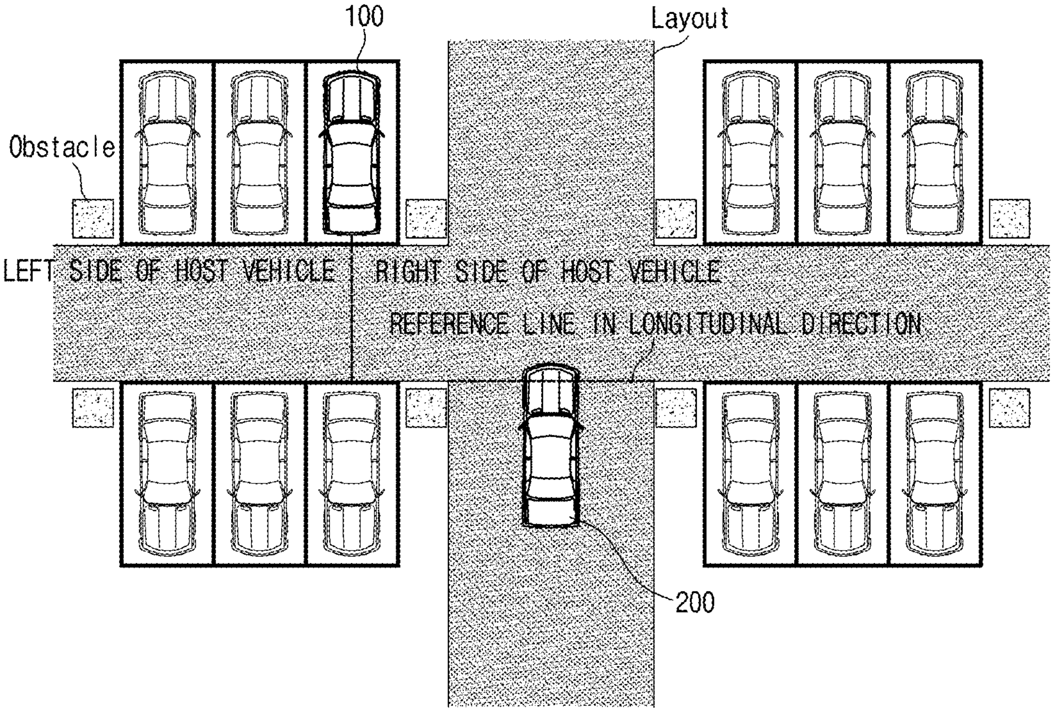

FIG. 3 is a flowchart illustrating a method for controlling the autonomous vehicle according to an embodiment of the present disclosure. FIGS. 4 to 6 are views for illustrating the structure of a parking lot visualized based on at least one sensor information and map information according to an embodiment of the present disclosure.

Referring to FIG. 3, the method for controlling the autonomous vehicle according to an embodiment of the present disclosure is as follows.

As a step S11, the autonomous vehicle may collect the sensor information provided by the sensor module 120 and the map information provided by the map storing unit 130 under the control of the processor 110.

Under the control of the processor 110, the autonomous vehicle may obtain information on the location of the host vehicle 100 and information on the surroundings of the host vehicle 100 based on the sensor information and the map information, which have been collected.

Under the control of the processor 110, the autonomous vehicle may analyze the obtained information on the location and surroundings of the host vehicle 100 and determine whether the host vehicle 100 has entered a parking lot (at a step S12).

In other words, under the control of the processor 110, the autonomous vehicle may determine whether the host vehicle 100 has entered a parking lot using at least one of the map information, the sensor information, or the information on the location and surroundings of the host vehicle 100.

For example, under the control of the processor 110, the autonomous vehicle may indicate "P (park)=0" when the host vehicle 100 has not entered a parking lot and "P (park)=1" when it has entered the parking lot. Here, the "P (park)" can be defined as a parameter for determining whether the host vehicle 100 has entered the parking lot.

Under the control of the processor 110, the autonomous vehicle may determine that the host vehicle 100 is in a parking lot when it is in an outdoor parking lot, a building rooftop, etc. by using at least one of GPS information of the vehicle, the map information, the sensor information, or the information on the location and the surroundings of the host vehicle 100.

Not limited thereto, under the control of the processor 110, when the host vehicle 100 is in a parking lot, the autonomous vehicle may determine whether the host vehicle 100 is currently in the parking lot by using the characteristics of the sensor information obtained by the sensor module 120 of the host vehicle 100.

For example, under the control of the processor 110, the autonomous vehicle may perceive the surroundings of the host vehicle 100, the other vehicle 200, the target vehicle 200, etc. by using the image perceiving technology of at least one of a camera, or one of the sensor modules 120.

Under the control of the processor 110, the autonomous vehicle may determine whether there is an obstacle, the other vehicle 200, the target vehicle 200, etc. in the surrounding environment of the host vehicle 100 based on the sensor information obtained by a distance measurement sensor, such as a camera, a radar, or a lidar, among the sensor modules 120.

As described above, under the control of the processor 110, the autonomous vehicle may not only determine whether the host vehicle 100 is placed in a row with other vehicles, such as in a parking lot, but also determine whether the host vehicle 100 is currently in a parking lot, based on at least one of the sensor information obtained by the sensor module 120, the GPS information of the vehicle, the map information, or the information on the location and the surroundings of the host vehicle 100.

Under the control of the processor 110, when determining that the host vehicle 100 has entered a parking lot, the autonomous vehicle may generate a layout of the parking lot by using the sensor information and the map information (at a step S13).

As shown in FIG. 4, under the control of the processor 110, the autonomous vehicle may generate an overall layout of a parking lot based on at least one of the sensor information, the GPS information of the vehicle, the map information, or the information on the location and the surroundings of the host vehicle 100. Here, the map information may include information on a precise map. The information on the precise map may be provided through a server in a parking lot or a building, etc. It is not limited thereto, and the information on the precise map may be provided in various ways.

For example, under the control of the processor 110, the autonomous vehicle may derive or determine the structure of a parking lot from at least one of the sensor information, the GPS information of the vehicle, the map information, or the information on the location and the surroundings of the host vehicle 100.

For example, under the control of the processor 110, the autonomous vehicle may accurately perceive vehicles parked in a parking lot, pillar structures between parking spaces, path guidance arrows on the floor of the parking lot, etc. through the image perceiving algorithm of a camera, or one of the sensor modules 120.

It may be possible for the processor 110 to distinguish between parking spaces where vehicles can be parked and passageways through which the vehicles pass to create a layout based on the results of the perceiving.

Under the control of the processor 110, the autonomous vehicle may derive the location of obstacles around the host vehicle 100 from the generated layout of the parking lot (at a step S14).

For example, under the control of the processor 110, the autonomous vehicle may determine whether there is an obstacle preventing access to the host vehicle 100.

For example, as shown in FIG. 4, under the control of the processor 110, the autonomous vehicle may derive or determine the structure of a parking lot from at least one of the sensor information, the GPS information of the vehicle, the map information, or the information on the location and the surroundings of the host vehicle 100, and, may determine the location of an obstacle around the host vehicle 100 based thereon.

The reason why the autonomous vehicle determines the location of the obstacle as described above may be to determine whether the straight-line movement path of the other vehicle 200 approaching the host vehicle 100 from a distance is obstructed by the obstacle.

Under the control of the processor 110, when there is another vehicle 200 that intersects a target line formed in a longitudinal direction of the host vehicle 100, the autonomous vehicle may set the other vehicle 200 as the target vehicle 200 (at a step S15).

For example, under the control of the processor 110, the autonomous vehicle may determine whether another vehicle 200 driving toward the host vehicle 100 from a distance in the longitudinal distance is sensed, and may set the other vehicle 200 as the target vehicle 200 when the other sensed vehicle 200 intersects the target line formed in the longitudinal direction.

Here, the processor 110 may set the target line and then set the other vehicle 200 as the target vehicle 200 based thereon. The target vehicle 200 may be referred to as a vehicle of interest or a target vehicle of interest 200.

As shown in FIG. 5, under the control of the processor 110, the autonomous vehicle may check whether another vehicle 200 is sensed on the left or right side of the host vehicle 100.

For example, under the control of the processor 110, the autonomous vehicle may check for an obstacle on the right side of the host vehicle 100 along with the other vehicle 200. when the sensed other vehicle 200 is on the right side of the host vehicle 100, and the autonomous vehicle may set the checked obstacle as an obstacle of interest or a target obstacle.

Under the control of the processor 110, the autonomous vehicle may create or form a target line, which is a virtual line connecting the center of the set target obstacle and the rear center of the host vehicle 100 in a straight line.

Under the control of the processor 110, the autonomous vehicle may determine whether there is an intersection where the formed target line and the direction in which the other vehicle 200 is moving forward intersect.

Under the control of the processor 110, when determining that there is such an intersection, the autonomous vehicle may determine that the other vehicle 200 is driving toward the host vehicle 100 and set the other vehicle 200 as the target vehicle 200.

Under the control of the processor 110, the autonomous vehicle may determine whether it is necessary to prevent a warning signal from being raised (e.g., suppressing a warning signal) based on the movement of the set target vehicle 200 (at a step S16).

For example, under the control of the processor 110, the autonomous vehicle may not generate a warning signal when the target vehicle 200 turns in the direction of the host vehicle 100 on a distant passage.

In other words, under the control of the processor 110, the autonomous vehicle may generate an exclusion signal so that a warning signal is not generated when the target vehicle 200 turns in the direction of the host vehicle 100 on a distant passage.

Under the control of the processor 110, when the set target vehicle 200 turns in the direction of the host vehicle 100 and the exclusion signal has been generated, the autonomous vehicle may not generate a warning signal, even though the warning conditions described in relation to FIG. 2 have been satisfied.

Thereafter, under the control of the processor 110, at a step S17, the autonomous vehicle may cancel the preventing of a warning signal (i.e., canceling the exclusion signal) when the target vehicle 200 has passed a target obstacle in the longitudinal direction.

As shown in FIG. 6, under the control of the processor 110, the autonomous vehicle may cancel the exclusion signal, which has been generated, when the target vehicle 200 has passed a reference line in the longitudinal direction of the target obstacle. In this case, the setting of the target vehicle 200 may be canceled, and the target vehicle 200 may be converted to another vehicle 200.

After the exclusion signal is canceled, the autonomous vehicle may continue to monitor the other vehicle 200 for the warning conditions under the control of the processor 110.

Figure 7:
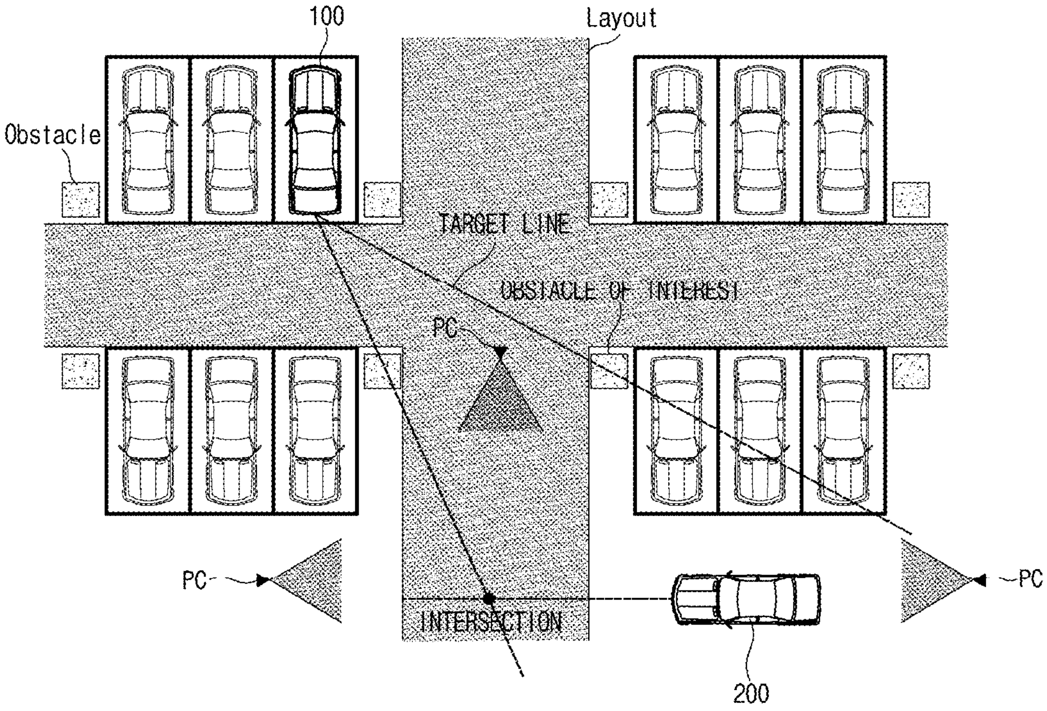
FIG. 7 is a view for illustrating a method of controlling an autonomous vehicle according to another embodiment of the present disclosure.

FIG. 7 is a view for illustrating a method of controlling an autonomous vehicle according to another embodiment of the present disclosure.

As shown in FIG. 7, according to another embodiment of the present disclosure, the autonomous vehicle may further receive information on the driving of a target vehicle 200 from a camera, a CCTV, and the like, installed in a parking lot.

In the present disclosure, it has been described that the target vehicle 200 approaching a host vehicle 100 is sensed through sensors in the host vehicle 100, but the present disclosure is not limited thereto. The information on the driving of the target vehicle 200 may be further provided through infrastructure such as a camera (PC) installed in a parking lot.

As such, under the control of the processor 110, the autonomous vehicle may further receive the information on the driving of the target vehicle 200 in addition to the sensor information, the GPS information of the vehicle, the map information, and the information on the location and the surroundings of the host vehicle 100, in order to set another vehicle 200 as the target vehicle 200 or cancel it more quickly while monitoring the other vehicle 200, thereby improving accuracy.

In addition, as the information on the driving of the target vehicle 200 is further provided, when the set target vehicle 200 or another vehicle 200 that has been converted from the target vehicle 200 to another vehicle 200 approaches the host vehicle 100 by turning in a direction that actually requires a warning signal, the autonomous vehicle may determine whether to generate a warning signal more quickly.

The control method, which has been described above, can be implemented as computer-readable codes on a program-recorded medium. Examples of a computer-readable medium include all types of recording devices that store data that can be read by a computer system, such as a hard disk drive (HDD), a solid-state disk (SSD), a silicon disk drive (SDD), a ROM, a RAM, a CD-ROM, a magnetic tape, a floppy disk, and an optical data storage device.

Accordingly, the detailed description should not be construed as restrictive in any respect but as illustrative. The scope of the present disclosure should be determined based on reasonable interpretation of the appended claims, and all changes within the scope of the present disclosure are included in the scope thereof.

What is claimed is:

1. A method of controlling a vehicle, comprising:

determining, by a processor executing computer instructions stored in a memory, a layout of a parking area based on sensor information provided by a sensor module and map information provided by a map storing unit, wherein the layout of the parking area includes parking spaces, passageways, and a location of an obstacle around a host vehicle, determining an obstacle on a same side as a target vehicle with respect to the host vehicle as a target obstacle, wherein the target vehicle intersects a target line defined based on a location of the target obstacle, and controlling, by the processor, the host vehicle to prevent generation of a warning signal based on a movement of the target vehicle.

2. The method of claim 1, further comprising:

obtaining information related to a location of the host vehicle and information related to surroundings of the host vehicle based on the sensor information and the map information, and determining an entrance of the host vehicle into the parking area based on the location of the host vehicle and the information related to the surroundings.

3. The method of claim 1, wherein controlling the host vehicle to prevent the generation of the warning signal comprises determining the target line based on a center of the target obstacle and a rear center of the host vehicle.

4. The method of claim 3, wherein controlling the host vehicle to prevent the generation of the warning signal further comprises determining the target vehicle based on an intersection between the target line and a heading direction of the target vehicle.

5. The method of claim 4, wherein controlling the host vehicle to prevent the generation of the warning signal further comprises excluding the target vehicle from an object to be warned about, based on a movement of the target vehicle turning into a direction of the host vehicle on a distant passage with reference to a preset distance.

6. The method of claim 5, wherein controlling the host vehicle to prevent the generation of the warning signal further comprises re-including the target vehicle as the object to be warned about, based on a movement of the target vehicle passing the target obstacle.

7. The method of claim 6, wherein controlling the host vehicle to prevent the generation of the warning signal further comprises monitoring the target vehicle for a rear cross-traffic collision-avoidance assist (RCCA).

8. A vehicle comprising:

a sensor module;

a map storing unit configured to store map information; and a processor configured to control a host vehicle by executing computer instructions stored in a memory, wherein the processor is further configured to:

determine a layout of a parking area based on sensor information provided by the sensor module and the map information, wherein the layout of the parking area includes parking spaces, passageways, and a location of an obstacle around the host vehicle, determine an obstacle on a same side as a target vehicle with respect to the host vehicle as a target obstacle, wherein the target vehicle intersects a target line defined based on a location of the target obstacle, and control the host vehicle to prevent generation of a warning signal based on a movement of a target vehicle.

9. The vehicle of claim 8, wherein the processor is further configured to:

obtain information related to a location of the host vehicle and information related to surroundings of the host vehicle based on the sensor information and the map information, and determine an entrance of the host vehicle into the parking area based on the location of the host vehicle and the information related to the surroundings.

10. The vehicle of claim 9, wherein the processor is further configured to determine the target line based on a center of the target obstacle and a rear center of the host vehicle.

11. The vehicle of claim 10, wherein the processor is further configured to determine the target vehicle based on an intersection between the target line and a heading direction of the target vehicle.

12. The vehicle of claim 11, wherein the processor is further configured to exclude the target vehicle from an object to be warned about, based on a movement of the target vehicle turning into a direction of the host vehicle on a distant passage with reference to a preset distance.

13. The vehicle of claim 12, wherein the processor is further configured to re-include the target vehicle as the object to be warned about, based on a movement of the target vehicle passing the target obstacle.

14. The vehicle of claim 13, wherein the processor is further configured to monitor the target vehicle for a rear cross-traffic collision-avoidance assist (RCCA).

15. A vehicle comprising:

a sensor module;

a map storing unit configured to store map information; and a processor configured to control a host vehicle by executing computer instructions stored in a memory, wherein the processor is further configured to:

determine whether a location of the host vehicle is within a parking area;

determine a location of obstacles around the host vehicle;

generate a target line based on the location of the host vehicle and the location of the obstacle;

determine, from among other vehicles, a vehicle whose heading direction crosses the target line as a target vehicle; and generate an exclusion signal that suppresses generation of a warning signal based on a determination that the target vehicle turns toward the host vehicle.

16. The vehicle of claim 15, wherein the processor is further configured to determine, as a target obstacle among the obstacles, an obstacle located on a same side as the target vehicle with respect to the host vehicle, and wherein the target line is a virtual line connecting a center of the target obstacle and a rear center of the host vehicle.

17. The vehicle of claim 15, wherein the processor is further configured to cancel the exclusion signal when the turned target vehicle has passed a reference line generated based on the target obstacle.

18. The vehicle of claim 15, wherein the processor is configured to generate the warning signal when a warning condition is satisfied, and the warning condition includes:

a first warning condition based on whether another vehicle has entered a preset warning area;

a second warning condition based on an angle at which the another vehicle enters toward the host vehicle; and a third warning condition including a time for the another vehicle, when driving at a current entering angle, to reach an intersection on a movement path of the host vehicle.

19. The vehicle of claim 18, wherein the exclusion signal controls the processor to suppress generation of the warning signal even when the target vehicle satisfies the warning condition.

* * * * *